United States Patent [19]
Schierer, Jr.

[11] 3,886,331
[45] May 27, 1975

[54] ELECTRONIC SCANNING SPECTROPHOTOMETER SYSTEM

[75] Inventor: Joseph Philip Schierer, Jr., Portland, Oreg.

[73] Assignee: Tektronix, Inc., Beaverton, Oreg.

[22] Filed: Sept. 14, 1973

[21] Appl. No.: 397,381

Related U.S. Application Data

[63] Continuation of Ser. No. 230,763, March 1, 1972, abandoned.

[52] U.S. Cl. ............ 235/151.3; 235/197; 235/194; 356/96; 356/83
[51] Int. Cl. ............................................. G01j 3/02
[58] Field of Search............ 235/151.3, 197, 150.53, 235/152; 356/96, 97, 83, 84, 100; 250/211 J

[56] References Cited
UNITED STATES PATENTS

| | | | |
|---|---|---|---|
| 2,414,486 | 1/1947 | Rieke | 315/1 |
| 3,011,391 | 12/1961 | Fastie | 356/100 |
| 3,369,447 | 2/1968 | Gallaway et al. | 356/96 |
| 3,496,404 | 2/1970 | Wendland | 250/211 J X |
| 3,508,813 | 4/1970 | Smith, Jr. et al. | 350/275 |
| 3,547,542 | 12/1970 | Bulpitt et al. | 356/83 |
| 3,561,872 | 2/1971 | Grabowski et al. | 356/83 |
| 3,646,331 | 2/1972 | Lord | 235/151.3 |

Primary Examiner—Eugene G. Botz
Assistant Examiner—Edward J. Wise
Attorney, Agent, or Firm—Klarquist, Sparkman, Campbell, Leigh, Hall & Whinston

[57] ABSTRACT

A spectrophotometer system is described in which the optical spectrum of an input light signal is linearly dispersed as a function of wavelength and the spectral image of a portion thereof is scanned electronically or mechanically to cause a photoelectric detector to produce an electrical analog output signal having spectral regions of different amplitudes corresponding to the intensity of the spectral image. The analog output signal is transmitted through a normalizer circuit for modulating by different predetermined amounts the amplitudes of such spectral regions to provide a normalized analog output signal which is compensated for the nonuniform wavelength response characteristics of the system. The detector may be an image detector in the form of a photosensitive semiconductor diode array which is scanned by electronic switching, or by an electron beam such as when the array is used as the target of an image tube. The normalizer circuit includes a function generator whose output is connected to one input of a multiplier circuit having its other input connected to the output of the detector to produce the normalized spectral signal at the output of such multiplier. The input of the function generator is a ramp voltage signal which starts at the beginning of the scan and may also be connected to the horizontal deflection plates of a cathode ray tube display device having the normalized spectral signal applied to its vertical deflection plates. An intensified marker spot is moved along the spectral signal waveform displayed on the screen of the cathode ray tube to indicate different wavelength portions and to provide a reference for expanding a portion of the display. A readout is provided on such screen of the wavelength and intensity power of the indicated wavelength portion after measurement by digital voltmeters.

21 Claims, 7 Drawing Figures

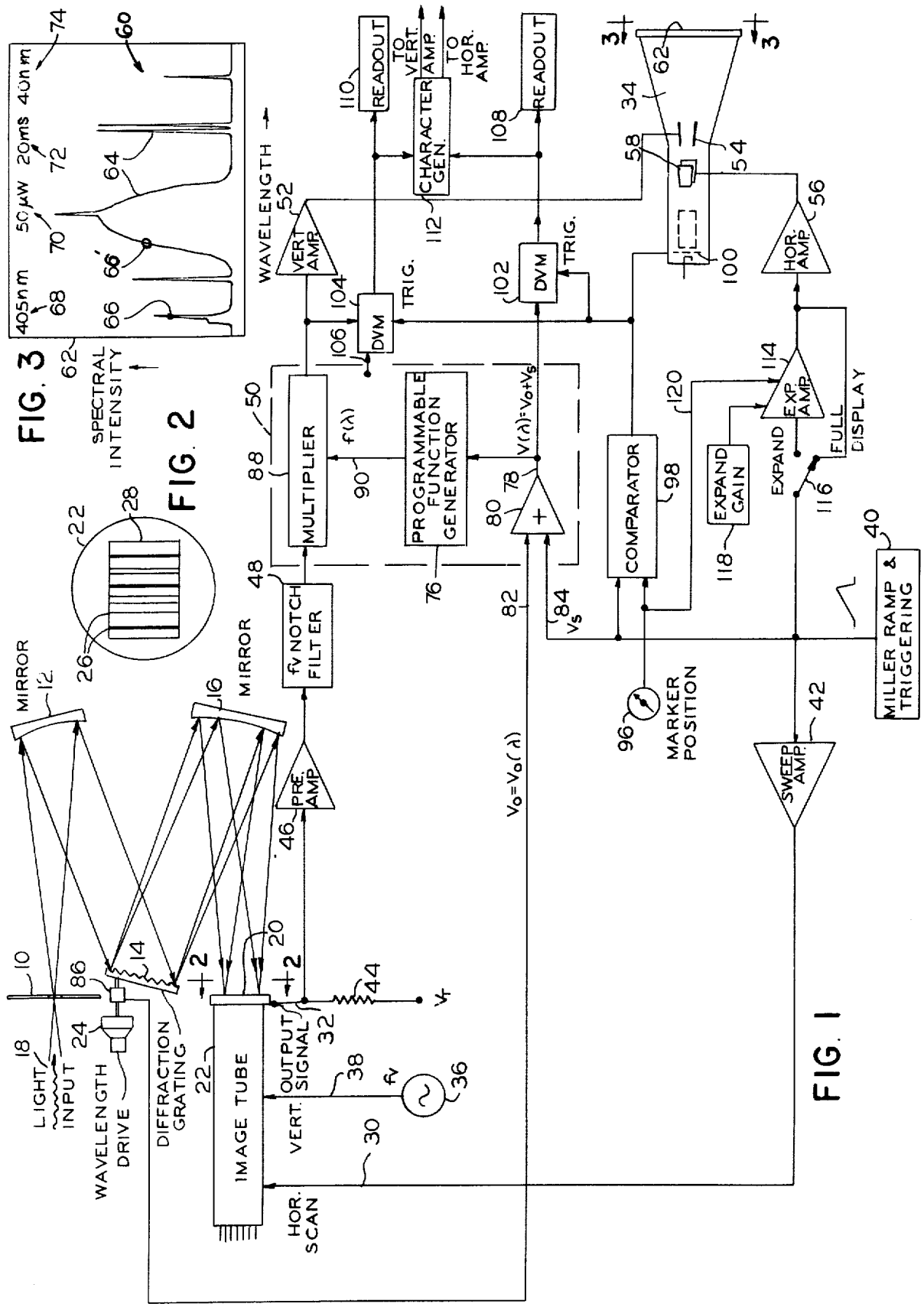

ELECTRONIC SCANNING SPECTROPHOTOMETER SYSTEM

REFERENCE TO RELATED APPLICATION

This is a continuation of copending United States patent application Ser. No. 230,763, filed Mar. 1, 1972, by J. P. Schierer, Jr., now abandoned.

BACKGROUND OF THE INVENTION

The subject matter of the present invention relates generally to spectrophotometers for dispersing the optical spectrum of an input light signal linearly as a function of wavelength and measuring such dispersed spectrum to determine the absolute spectral power intensity of small spectral intervals, and in particular to a spectrophotometer system including means for scanning the spectral image of such dispersed spectrum to cause a photoelectric detector to produce an electrical analog output signal corresponding to the spectral image and a normalizing circuit for modulating the amplitude of such spectral signal by different predetermined amounts to compensate for nonuniform wavelength response characteristics of the system. A normalized spectral analog output signal having spectral power distributions of proper amplitude accurately related to the intensity of the input light spectrum is produced at the output of the normalizing circuit. The term "light" as used herein refers to ultraviolet and infrared, as well as visible portions of the optical spectrum.

The spectrophotometer system of the present invention is especially useful for rapid scan chemical analysis and may be used to study environmental pollution resulting from solid, liquid and gasseous contaminants. The present spectrophotometer system covers an extremely wide range of the optical spectrum from ultraviolet light to infrared light and can analyze large portions of this spectrum at extremely fast scanning rates on the order of milliseconds or less by employing electronic scanning and a photoelectric detector. The photoelectric detector may be an image detector such as a television camera type image tube having a photosensitive target in the form of a semiconductor diode array scanned by an electron beam as shown in U.S. Pat. No. 3,011,089 of F. W. Reynolds granted Nov. 28, 1961, and U.S. Pat. No. 3,496,404 of P. H. Wendland granted Feb. 17, 1970.

Previous spectrophotometers, such as that shown in U.S. Pat. No. 2,240,722 of H. A. Snow granted May 6, 1941, have employed image tubes as the detector of such spectrophotometers to enable electronic scanning. However, these prior electronic scanned spectrophotometer systems have suffered from narrow wavelength ranges and inaccurate intensity measurements due to nonuniform wavelength response characteristics of the system. These disadvantages have been overcome by the spectrophotometer of the present invention by employing the normalizing circuit and a photoelectric detector in the form of a photosensitive semiconductor diode array which may be provided as the photosensitive target of an image tube. Such an image tube has a wide wavelength response from 300 nanometers to 1,100 nanometers and has a high quantum efficiency which is greater than 80 percent at 500 nanometers wavelength.

A more recent electronic scanning spectrophotometer shown in U.S. Pat. No. 3,235,798 of M. J. O. Strutt granted Feb. 15, 1966, employs regulator stages to modify the output signal of the photosensitive image tube and produce a digital output signal which provides a discontinuous display of lower resolution on the cathode ray tube display device. The present system avoids this reduced resolution by producing a normalized analog spectral signal which is displayed on the cathode ray tube. Another disadvantage is that the photosensitive detector tube of Strutt is only scanned in one direction transversely across the spectral slit image so that any variation in intensity longitudinally along such image will cause an error in the output signal of this detector. This error is avoided in the apparatus of the present invention by deflecting the electron beams of the image detector tube vertically with a high frequency deflection signal while scanning across the spectral bands with a horizontal ramp signal of much lower frequency. This deflection signal can be a sine wave, a sawtooth, or other repetative signal. As a result, the beam moves longitudinally up and down along the entire length of the spectral images while scanning transversely across such band to produce a spectral analog output signal which is integrated to provide band portions having amplitudes proportional to the average intensity of each band. This also increases the output signal level greatly and increases the signal to noise ratio.

The spectophotometer system of the present invention also provides a marker spot on the screen of the cathode ray tube which is used as a pointer and moved along the the spectral signal display to indicate different wavelengths and readout means including digital voltmeters for measuring the wavelength and intensity of the indicated spectral region and reading out the measured values directly on the cathode ray tube. Such pointer spot is also employed to indicate the center of an expanded signal display which is a selected region of the spectral display that has been electronically expanded in the wavelength axis by changing the gain of the horizontal amplifier. This pointer spot and readout reduces operator error and greatly facilitates the operation of the spectrophotometer system.

SUMMARY OF THE INVENTION

It is, therefore, one object of the present invention to provide an improved spectrophotometer system which operates over a wide wavelength range and provides a spectral output signal as a normalized analog signal whose amplitude is proportional to the intensity of narrow intervals of the optical spectrum even though the spectrometer and detector of such system have nonuniform wavelength and response characteristics.

Another object of the invention is to provide such a spectrophotometer system capable of extremely rapid scanning speed and which produces a normalized analog spectral signal display of high resolution.

A further object of the invention is to provide such a spectrophotometer system in which a photoelectric image detector is employed and includes a semiconductor diode array which is electronically scanned either by an electron beam or by electronically switching such diodes to provide a wide wavelength range spectral response, high photoelectric conversion efficiencies, good storage and fast response time characteristics.

Still another object of the present invention is to provide such a spectrophotometer system with a photosensitive image tube having the diode array as its photosensitive target which is scanned by deflecting an electron beam horizontally across the spectral images produced on such target and is scanned vertically at a much higher frequency along the length of each spectral image to produce a spectral output signal corresponding to the average intensity of the spectral interval that is of a higher signal level and greater signal to noise ratio.

A still further object of the present invention is to provide such a spectrophotometer in which the normalized spectral output signal is displayed on a cathode ray tube and a pointer spot is moved along the spectral signal display to indicate selected spectral intervals of such display, and the wavelength and intensity of such selected spectral intervals are measured and displayed on the screen of such tube.

An additional object of the invention is to provide such an improved spectrophotometer system employing an improved optical slit member of relatively low cost, and high slit accuracy which is movable for multiple slit capability.

BRIEF DESCRIPTION OF DRAWINGS

Other objects and advantages of the present invention will be apparent from the following detailed description of certain preferred embodiments thereof and from the attached drawings of which:

FIG. 1 is a schematic diagram of one embodiment of the spectrophotometer system of the present invention employing a photosensitive image tube as the detector of such system.

FIG. 2 is a view taken along the line 2—2 of FIG. 1 showing a line spectrum image on the photosensitive target of the image detector tube;

FIG. 3 is a view taken along the line 3—3 of FIG. 1 showing the spectral signal displayed on the cathode ray tube;

DESCRIPTION OF PREFERRED EMBODIMENTS

Figure 7:
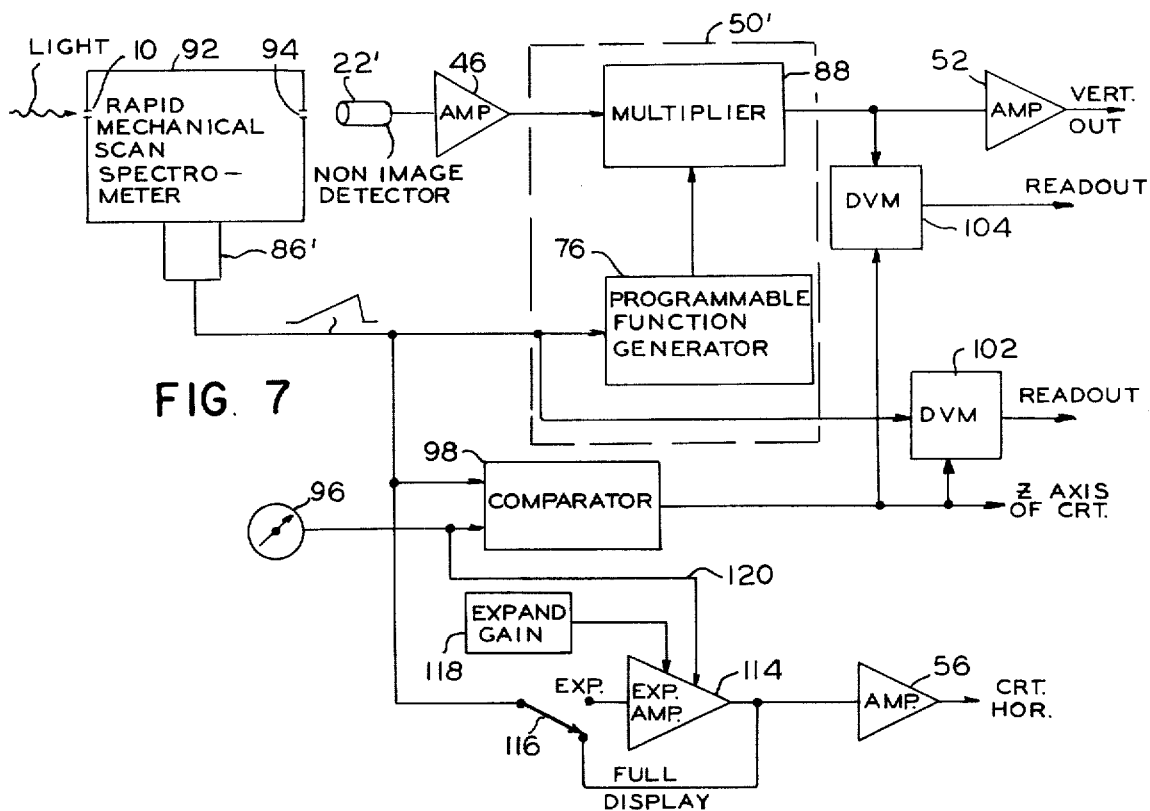
FIG. 7 is a schematic diagram of another embodiment of the spectrophotometer system of the present invention employing mechanical scanning and a non-image type photoelectric detector.

As shown in FIG. 1, one embodiment of the spectorphotometer system of the present invention has a conventional optical system including an entrance slit 10, a first spherical mirror 12, a movable diffraction grating 14, and a second spherical mirror 16. This can be a "coma corrected Czerny-Turner" optical system like that shown in U.S. Pat. No. 3,011,391 of W. G. Fastie granted Dec. 5, 1961. An input light signal 18 containing light of many different wavelengths is transmitted through the slit in the entrance slit member 10 and is collimated and reflected by mirror 12 onto the diffraction grating 14. The diffraction grating diffracts the light at different angles according to its wavelength and the output mirror 16 focuses this light thereby transforming this angular dispersion into a linear dispersion at a focal plane 20 where a photoelectric detector 22 is positioned. Thus, detector 22 may be an image tube having a photosensitive target positioned in the image plane 20. The image tube 22 is preferably a vidicon type television camera tube having a photosensitive target in the form on a PN junction silicon diode array as shown in U.S. Pat. No. 3,011,089 of F. W. Reynolds granted Nov. 28, 1971, or a metal to semiconductor diode array like that of U.S. Pat. No. 3,496,404 of P. H. Wendland granted Feb. 17, 1970. Of course, other optical systems can be employed and a prism or other wavelength separating element substituted for the diffraction grating 14. It should be noted that the diffraction grating 14 can be pivoted by means of a wavelength drive knob 24 to change the incident angle at which the input light signal strikes such diffraction grating so that the portion of the optical spectrum focused upon the image plane 20 of the detector tube 22 changes with different settings of knob 24.

As shown in FIG. 2, the image detector tube 22 has spectral lines or light bands 26 of different wavelengths focused on a photosensitive storage target 28 within such tube so that an electrical charge image of such lines is produced on such target. The light bands 26 are spaced horizontally from each other as a result of the separation by the diffraction grating. The light bands 26 are of different optical intensity so that the corresponding charge images produced on the photosensitive target 26 are of different magnitudes proportional to such optical intensity. An electron beam within the image tube 22 is deflected in a horizontal direction transversely across the light bands 26 by a ramp voltage applied through a horizontal input conductor 30 to horizontal deflection plates within the tube. This horizontal scanning causes an electrical output signal, hereafter referred to as the "spectral signal," to be produced on an output conductor 32 connected to the photosensitive target or a collector electrode within the detector tube 22, such spectral signal being an analog signal having spectral intervals at times corresponding to the spectral distribution of the light bands 26 and having amplitudes related to the intensity of such light bands. This spectral signal is transmitted to a cathode ray tube 34 after normalization in a manner hereafter described to produce a signal display similar to that shown in FIG. 3.

The electron beam of the image detector tube 22 is also deflected longitudinally along the light bands 26 by a vertical deflection signal of high frequency, $f_v$, which may be a sine wave, a sawtooth or other repetitive waveform that is produced by an oscillator 36 and transmitted through vertical input conductor 38 to vertical deflection plates within such tube. This vertical deflection signal is of much higher frequency than that of the horizontal ramp signal which is produced by a ramp generator circuit 40 of the Miller integrator type and associated triggering circuits and transmitted through an amplifier 42 to the horizontal input conductor 30. For example, the vertical deflection signal produced by oscillator 36 may have a frequency between 1 and 15 megahertz while the horizontal deflection signal which is produced by the ramp generator circuit 40 may have a frequency of between 10 and 10,000 hertz. As a result, the electron beam is deflected up and down many times along the entire length of each light band charge image 26, so that the corresponding spectral interval of the spectral output signal produced on conductor 32 has an amplitude corresponding to the average intensity of the entire light band. This eliminates the inaccuracies that occur when scanning the light bands only horizontally or slowly stepping them sequentially in a vertical direction because the intensity of the band often varies along the length of the band.

The spectral output signal produced on conductor 32 is a current signal which is converted to a voltage signal by transmission through a load resistor 44. Load resistor 44 may alternately be a feedback resistor in an operational amplifier, thereby making preamplifier 46 a current detecting amplifier. The spectral voltage signal is then transmitted through a preamplifier 46 and a notch filter 48 to the input of a normalizing circuit 50 shown within a dashed line box. The notch filter 48 blocks signals of the frequency, $f_v$, of the vertical deflection signal of oscillator 36 so that the spectral signal applied to the normalizing circuit 50 is free of this high frequency modulation. Alternately, a sharp rolloff filter with frequency rolloff point of less than $f_v$ may be employed instead of a notch filter.

The normalizing circuit 50 corrects for nonuniform wavelength response characteristics of the optical system to provide a normalized analog spectral output signal having spectral intervals or bands whose amplitudes are proportional to the intensity of the corresponding light bands of the input light signal 18. This normalized spectral output signal is transmitted through a vertical amplifier 52 to vertical deflection plates 54 of the cathode ray tube 34. In addition, the horizontal ramp voltage produced by ramp generator 40 is transmitted through a horizontal amplifier 56 to horizontal deflection plates 58 within such cathode ray tube in order to produce a spectral signal display 60 on the phosphor screen 62 of such tube.

As shown in FIG. 3, the spectral signal display 60 includes spectral intervals on bands 64 corresponding to the light bands 26 focused onto the image detector tube 22 and having vertical amplitudes proportional to the spectral intensity of such light bands. The horizontal position of the spectral bands 64 of the display is proportional to the wavelength of the light bands 26. As a result, the cathode ray tube display may be calibrated vertically in microwatts of spectral power intensity and horizontally in terms of nanometers of wavelength, or in other equivalent terms. An intensified marker spot or indicator 66 of higher brightness is produced on the phosphor screen 62 and moved along the spectral signal display 60 in a manner hereafter described to indicate different spectral regions 64 while the wavelength and intensity of the indicated spectral regions are measured and the measured values displayed as readouts 68 and 70 at the top of the phosphor screen. For example, readouts 68 and 70, respectively, show that the spectral region indicated by pointer 66 has a wavelength of 405 nanometers and an intensity of 50 microwatts. In addition, another readout 72 of the scanning speed in milliseconds, as well as a fourth readout 74 of the wavelength interval of the entire spectral signal display 60 in nanometers, may also be provided at the top of the phosphor screen. This readout is extremely convenient for the operator since it minimizes errors in reading the knobs and calculating the spectral sensitivity of the display, etc., and also provides a permanent label on any photographs or hard copies which are taken of the display.

As shown in FIG. 1, the normalizer circuit 50 includes a programmable function generator 76 of the type shown in pending U.S. patent application Ser. No. 229,901 by J. W. Pace entitled PROGRAMMABLE FUNCTION GENERATION filed on Feb. 28, 1972 now U.S. Pat. No. 3,740,539. The input of the function generator 26 is connected to the output 78 of an adder amplifier 80 having one input 82 connected to the output of a potentiometer 86 and another input 84 connected to the output of the ramp voltage generator 40. The potentiometer 86 applies a D. C. offset voltage, $V_o$, to conductor 82 whose value depends upon the setting of the wavelength drive knob 24 which adjust the position of the diffraction grating 14. Thus, the offset voltage $V_o$ corresponds to the start of the spectral signal display 60 since the first band portion of such display has a wavelength which depends upon the setting of the wavelength drive control knob 24. This offset voltage is added to the scan voltage, $V_s$, of the ramp signal produced by ramp generator 40 and applied to the input conductor 84, as well as to the horizontal deflection plates of the image detector tube 22 to provide a wavelength voltage $V(\lambda)$ at the output 78 of adder 80 which is equal to $V_o + V_s$. Therefore, the amplitude of the wavelength voltage $V(\lambda)$ is directly proportional to the wavelength being scanned at that instant and the corresponding spectral signal transmitted through amplifier 46 and filter 48 to the input of a multiplier circuit 88 in the normalizer 50. The function generator 76 is connected at its output to a control input 90 of the multiplier circuit 88 to apply a multiplier signal, $f(\lambda)$, thereto which is a function of the wavelength position ramp voltage input $V(\lambda)$ that is programmed into the function generator. This attenuates or otherwise modulates the spectral analog input signal to produce a normalized spectral analog signal at the output of such multiplier.

As a result of normalization, each spectral interval of the spectral signal corresponding to a different wavelength of light is modulated a different predetermined amount in order to compensate for nonuniform wavelength response characteristics of the entire system. In other words, the amount of modulation provided by the multiplier 88 in response to the output signal of the function generator is automatically changed in synchronism with the arrival at such multiplier of different wavelengths of the spectral signal, due to the wavelength position control provided by the ramp voltage $V(\lambda)$ applied to the input of the function generator. The function generator 76 is programmed to provide the proper multiplier signal $f(\lambda)$ at its output so that such program may be changed for different optical systems and the use of a different diffraction grating, optical slit and detectors in order to correct for their nonuniform wavelength response characteristics.

As shown in FIG. 7, a modified normalizer circuit 50' can also be employed with a mechanically scanned spectrophotometer 92 and a nonimage photoelectric detector 22'. In this case, the adder circuit 80 is eliminated and the input signal of the function generator 76 is supplied solely by a ramp output signal of a potentiometer 86'. The potentiometer varies with different settings of a motor operated control which moves a mirror or the grating to accomplish the mechanical scanning.

The mechanical scan spectrophotometer 92 is provided with an output slit 94 in front of a nonimage detector 22', such as a photomultiplier tube. Thus, the spectral image of all the light bands 26 produced in one setting of the diffraction grating is scanned across the output slit 94 to produce a corresponding spectral analog output signal at the output of the detector 22'. The ramp voltage scan signal produced by the potentiometer 86' during mechanical scanning is also supplied as the horizontal deflection signal through amplifier 56 to the horizontal deflection plates of the cathode ray tube 34. Rather than mechanical scanning, the spectrophotometer 92 of FIG. 7 may be provided with an electro-optical scanning device between the second mirror 16 and the exit slit 94 for scanning the light image past the exit slit to detector 22'. One suitable electro-optical scanning device is shown in U.S. Pat. No. 3,447,855 of J. G. Skinner granted June 3, 1969. Thus, the electro-optical scanning device deflects light by the Pockets effect when a ramp voltage is applied thereto which is also employed as the horizontal ramp signal in place of the potentiometer 86'.

Both spectrophotometer systems of FIGS. 1 and 7 are provided with additional circuitry for forming the pointer or marker spot 66 on the spectral signal display 60 of the cathode ray tube, and means for measuring the wavelength and intensity power of the selected band portion 64 indicated by such spot. Thus, a variable D.C. voltage source 96 for changing the marker position is supplied to one input of a comparator circuit 98 whose other input is connected to the ramp voltage output provided by ramp generator 40 in FIG. 1 and by potentiometer 86' in FIG. 7. Thus, when the ramp voltage equals the marker position voltage, comparator 98 switches on and produces an output pulse. The output of the comparator 98 is connected to the z-axis input, such as control grid 100, of the cathode ray tube 34, in order to momentarily increase the current of the electron beam in such tube to provide the intensified pointer 66. In addition, the comparator output pulse is applied as a trigger pulse to a first digital voltmeter 102 connected to the input of the function generator, and to a second digital voltmeter 104 connected to the output of multiplier 88 to cause such voltmeters to measure the wavelength voltage V(λ) and the normalized spectral signal voltage, respectively, when the marker spot is produced. Scale factor inputs 106, such as slit size, can also be applied to the voltmeter 104 so that it accurately measures the spectral power of the spectral interval indicated by the pointer spot. The outputs of voltmeters 102 and 104 can be connected, respectively, to a wavelength readout device 108 and an intensity readout device 110, such as meters or numerical display tubes. However, for maximum convenience, the outputs of the digital voltmeters 102 and 104 are connected to a character generator 112 which supplies character genrator signals through amplifiers 52 and 56 to the vertical and horizontal deflection plates of the cathode ray tube 34 to provide the readout displays 68 and 70 on the phosphor screen 62 of such tube, as shown in FIG. 3.

In addition, it may be desirable to electronically expand the horizontal axis of a portion of the spectral signal display 60 in order to study such display in greater detail. For this purpose, an expand amplifier 114 is provided with its input connected by a switch 116 to the horizontal ramp generator 40 in the "expand" position of such switch. The output of the expand amplifier 114 is connected through the horizontal amplifier 56 to the horizontal deflection plates 58 of the cathode ray tube. An expand gain control 118 may be provided on the expand amplifier 114 for varying the amount of expansion. Also, the marker position voltage source 96 is connected by a conductor 120 to the expand amplifier 114 so that the center of the expand portion is determined by the position of the pointer spot 66. Of course, other types of pointer spots can be employed rather than intensified spots, such as a small circular ring spot 66' produced by applying two sine waves 90° out of phase to the horizontal and vertical deflection plates by switching at a time corresponding to the trigger output of comparator 98.

Figure 6:
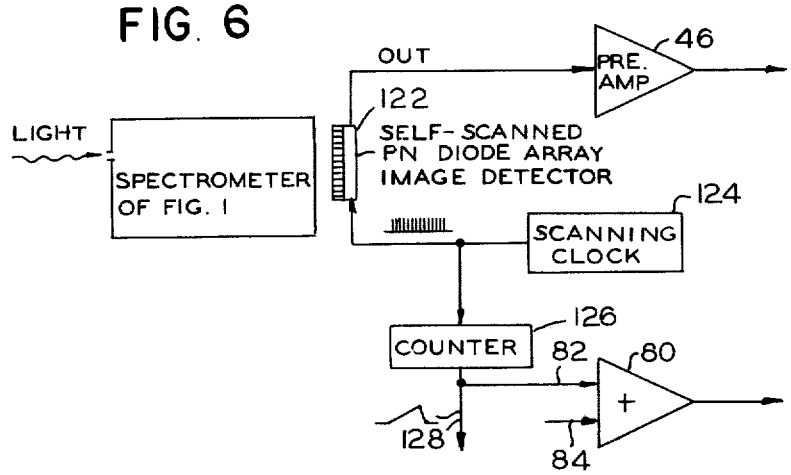
FIG. 6 is a schematic diagram of a modification of the spectrophotometer system of FIG. 1 employing a different type of image detector and scanner.

As shown in FIG. 6, the spectrophotometer system of FIG. 1 can employ a different photosensitive image detector 122 in place of image detector tube 22. The image detector 122 is a semiconductor junction diode array which may be of the self-scanning type having associated switches provided as part of an integrated circuit containing such array. Entire rows of diodes corresponding to different wavelengths of light bands 26 are switched sequentually in time by the pulsed output signal of a scanning clock oscillator 124. The clock pulses are also supplied to a digital counter 126 which produces a ramp voltage output that is supplied to input terminal 82 of the adder 80 and is also transmitted through a conductor 128 to the horizontal amplifier 156 as the horizontal deflection signal of the cathode ray tube 34. Of course, in this embodiment the amplifier 42 and the oscillator 36 providing the electron beam deflection voltages for the camera tube 22 are not needed. However, the normalizing circuit 50 and the remainder circuit of the system of FIG. 1 is still employed, but is not shown in FIG. 6 for brevity.

Figure 5:
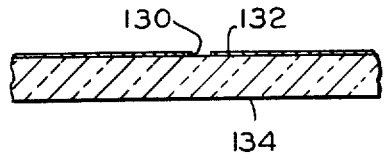
FIG. 5 is a section view taken along the line 5—5 of FIG. 4.
Figure 4:
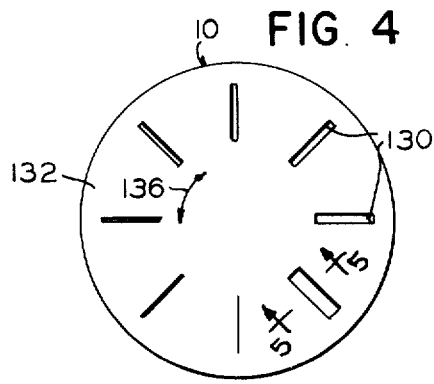
FIG. 4 is a plan view of a novel optical slit member.

As shown in FIGS. 4 and 5, the optical slit member 10 of the spectrophotometer systems may be in the form of a rotatable disc having provided thereon a plurality of slits 130 of different width. The slits are formed by openings through a deposited layer 132 of light opaque metal, such as chromium, aluminum, provided on a light transparent substrate member 134 of glass, quartz or other materials which are transparent to the optical spectrum of the spectrophotometer. Each of the slits 130 is of extremely uniform width and may be formed by chemically etching the metal layer 132. Since the optical slit member 10 may be rotated in the direction of arrow 136, different width entrance slits may easily be provided for the spectrophotometer. The optical slit member has the advantage of being easy and relatively inexpensive to manufacture, as well as being able to provide slits of extremely accurate and uniform width. For example, the slits 130 may include extremely narrow slits of 10 microns width + or −0.5 micron tolerance. Such accurate slit width tolerances are necessary for accurate absolute spectroradiometric measurements since optical spectral power is a function of the input slit area. Of course, it is also possible to form the slit member 10 of a rectangular shape so that the slits are positioned in a row and such rectangular member is moved longitudinally to change the entrance slit of the spectrophotometer.

It will be obvious to those having ordinary skill in the art that many changes may be made in the details of the above-described preferred embodiments of the present invention without departing from the spirit of the invention. A few of these obvious modifications have been indicated previously. Therefore, the scope of the present invention should only be determined by the following claims.

I claim:

1. A spectrophotometer apparatus in which the improvement comprises:

optical means for separating an input light signal into spacially displaced spectral images of light of different wavelengths and intensities;

photoelectric detector means for receiving and measuring said spectral images;

scanning means for scanning said spectral images to cause said detector means to produce an electrical analog output signal including spectral intervals having time and amplitude characteristics corresponding to the wavelength and intensity of said spectral images, said scanning means also producing an electrical analog control signal during said scanning; and electronic normalizer means connected to the output of said detector means, including function generator means for changing by different predetermined amounts the amplitudes of the spectral intervals of said analog output signal in response to a predetermined electrical output signal produced by said function generator means when the analog control signal is applied to the input of said function generator means by said scanning means, to compensate for nonuniform spectral response characteristics of said apparatus and to produce a normalized analog output signal whose spectral intervals have amplitudes proportional to the intensities of the corresponding spectral images of the input light signal.

2. Apparatus in accordance with claim 1 in which the scanning means is an electronic scanning means for scanning the detector means.

3. Apparatus in accordance with claim 2 which also includes a display means for providing a visual display of said normalized analog output signal, said display means being synchronized to said electronic scanning means.

4. Apparatus in accordance with claim 3 in which the detector means is an image tube having a photosensitive target, the display means is a cathode ray tube and the scanning signal generator means includes a ramp voltage generator means for applying a horizontal scan signal to horizontal deflection means in both the image tube and a cathode ray tube, said normalized output signal being applied to the vertical deflection means of said cathode ray tube.

5. Apparatus in accordance with claim 4 in which the image tube has a vertical deflection means connected to the output of an oscillator producing a vertical scan signal of high frequency many times that of said horizontal scan signal.

6. Apparatus in accordance with claim 3 in which the display means includes a cathode ray tube having a phosphor screen which produces a light image display of the waveform of said normalized signal, and pointer means for producing a pointer spot on said phosphor screen which is movable along said waveform to different selected spectral intervals.

7. Apparatus in accordance with claim 6 in which the pointer spot is an intensified spot of greater brightness than the waveform display.

8. Apparatus in accordance with claim 6 in which the pointer spot is a circular ring.

9. Apparatus in accordance with claim 6 in which the display means also includes an expander means for changing the slope of a horizontal ram signal applied to the horizontal deflection means of the cathode ray tube to expand the horizontal axis without expanding the verticle axis of a selected portion of the signal display indicated by the pointer spot.

10. Apparatus in accordance with claim 6 in which the display means includes a readout means for producing a readout display on said phosphor screen of the wavelength of the selected spectral interval of the signal display indicated by the pointer spot.

11. Apparatus in accordance with claim 6 in which the display means includes a readout means for producing a readout display or said phosphor screen of the intensity of the selected spectral interval indicated by the pointer spot.

12. Apparatus in accordance with claim 2 in which the detector means is a photosensitive image detector.

13. Apparatus in accordance with claim 12 in which the detector is an image tube having a photosensitive target and an electron beam deflection means for scanning said target connected to the output of a scanning signal generator means.

14. Apparatus in accordance with claim 12 in which the image detector is a semiconductor photosensitive diode array and the scanning means includes electronic switch means for selectively switching the diodes of said array to scan the detected images.

15. Apparatus in accordance with claim 12 in which the image detector is an image tube having a semiconductor diode mosaic photosensitive target.

16. Apparatus in accordance with claim 1 in which the optical means includes a movable slit member having a plurality of light transparent slits of different width which are selectively moved into the path of the input light signal transmitted to the detector means to determine the width of the spectral image.

17. Apparatus in accordance with claim 16 in which the slit member includes a light transparent support plate having a light opaque coating on one side of said support plate, said coating being provided with a plurality of spaced openings therethrough to form said slits.

18. Apparatus in accordance with claim 1 in which the normalizer means includes a multiplier circuit having one input connected to the output of the detector means and another input connected to the output of the function generator whose input is connected to a ramp signal generator, said function generator being programmable to provide different predetermined function output signals.

19. Apparatus in accordance with claim 18 in which the ramp signal generator applies a ramp signal to the scanning means for scanning the detector means and applies a corresponding ramp control signal to the function generator for producing a function output signal which is multiplied with the detector output signal to produce said normalized output signal.

20. Apparatus in accordance with claim 19 in which the optical means includes a movable diffraction grating and an associated control means for moving the grating and producing a D.C. offset signal correspoinding to the position of said grating, and the normalizer means includes an adder circuit having one input connected to the output of the control means and another input connected to the ramp signal generator for adding the offset signal to the ramp signal to produce a combined signal which is applied as the control signal to the function generator.

21. A spectrophotometer apparatus in which the improvement comprises:
optical means for separating an input light signal into spectral images of light of different wavelengths;
photoelectric detector means for receiving and measuring said spectral images, said detector means including a photosensitive charge image tube having a PN semiconductor diode mosaic photosensitive target and an electron beam deflection means;
electronic scanning means for applying a scanning signal to said deflection means to scan said electron beam across said target to produce on an output terminal of said tube an electrical output signal including spaced spectral intervals corresponding to the spectral images detected by said target; and
electronic normalizer means connected to the output of said detector means for changing by different predetermined amounts the amplitudes of the spectral intervals of said output signal in response to a control signal corresponding to the scanning signal.

* * * * *